Figure 1:
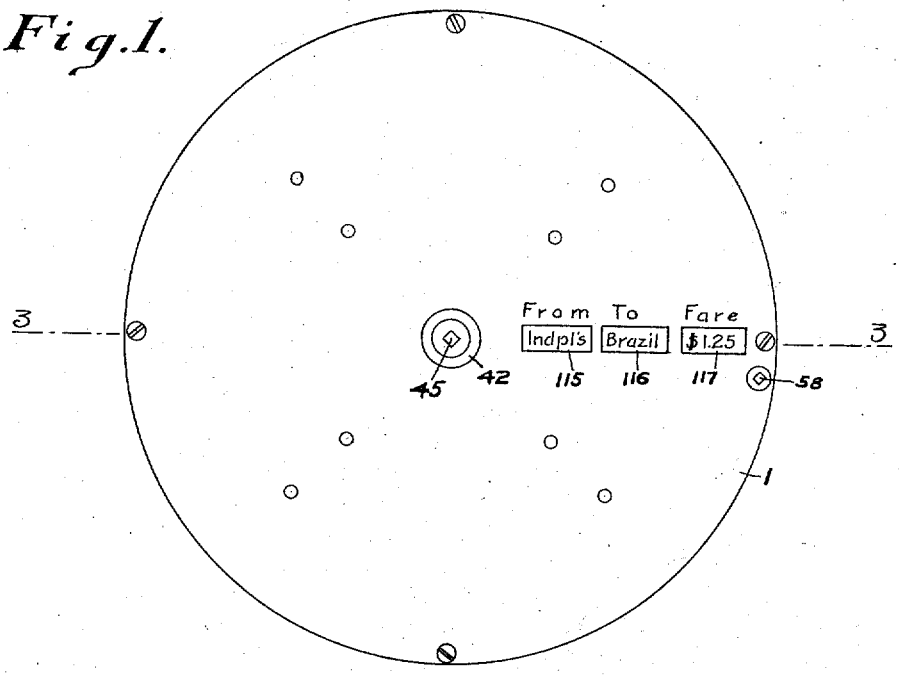

F. A. MORGAN.

INDICATING AND RECORDING DEVICE.

APPLICATION FILED MAR. 22, 1910.

Reissued Oct. 18, 1910.

13,159.

6 SHEETS—SHEET 1.

WITNESSES

Wm. L. Bushong.

L. B. Moerner.

INVENTOR

Frederick A. Morgan,

By Minturn & Moerner,

ATTORNEYS.

THE NORRIS PETERS CO., WASHINGTON, D. C.

F. A. MORGAN.
INDICATING AND RECORDING DEVICE.
APPLICATION FILED MAR. 22, 1910.
Reissued Oct. 18, 1910.
13,159.
6 SHEETS—SHEET 2.
Fig. 12.
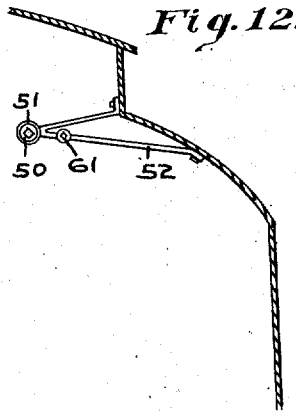
Fig. 13.
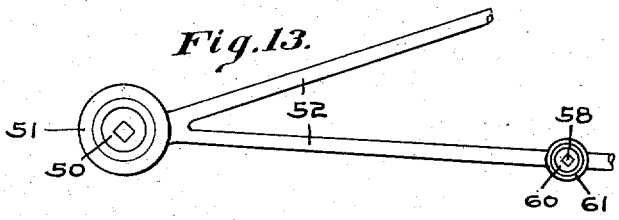
Fig. 14.
Fig. 3.
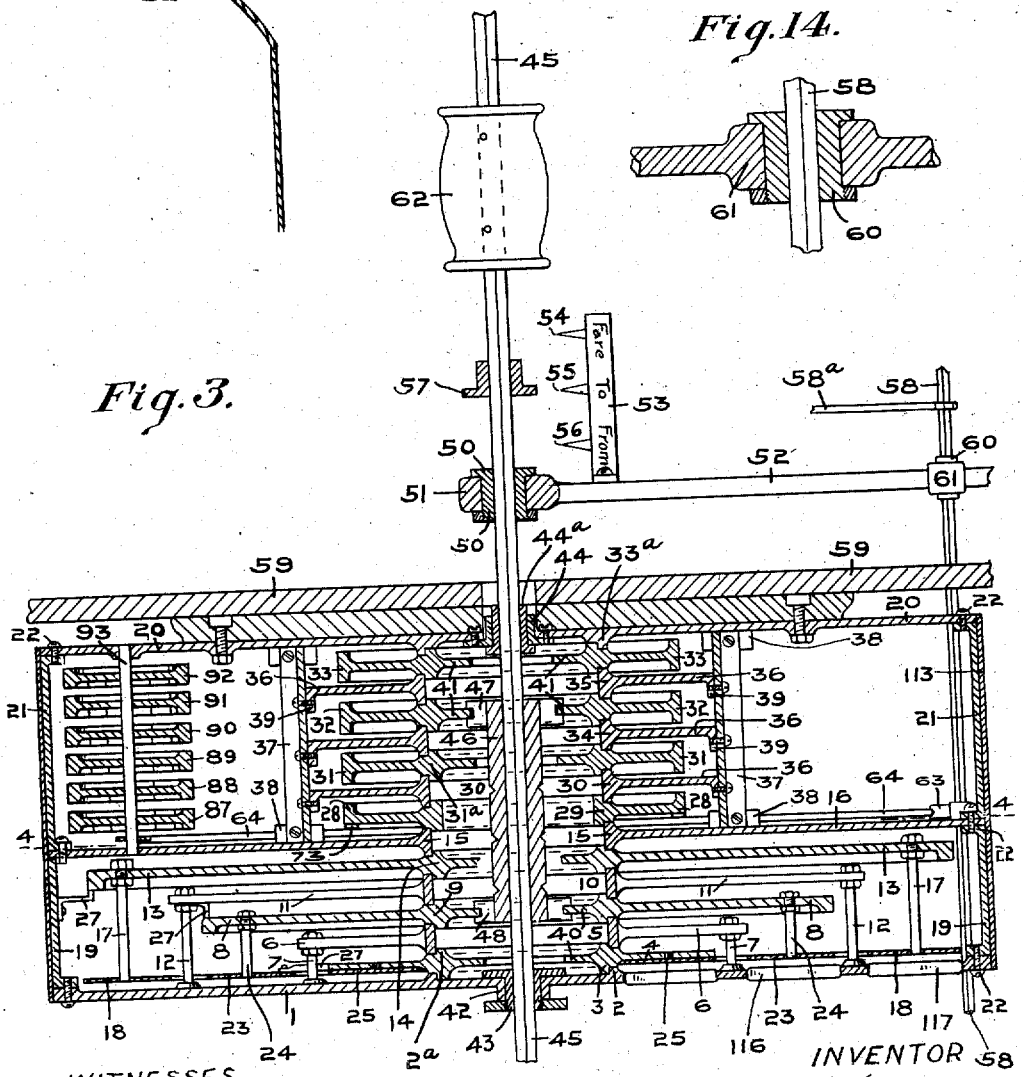
THE NORRIS PETERS CO., WASHINGTON, D. C.

F. A. MORGAN.

INDICATING AND RECORDING DEVICE.

APPLICATION FILED MAR. 22, 1910.

Reissued Oct. 18, 1910.

13,159.

6 SHEETS—SHEET 3.

WITNESSES

Wm. L. Bushong.

L. B. Moerner.

INVENTOR.

Frederick A. Morgan,

By Minturn & Moerner

ATTORNEYS.

THE NORRIS PETERS CO., WASHINGTON, D. C.

F. A. MORGAN.

INDICATING AND RECORDING DEVICE.

APPLICATION FILED MAR. 22, 1910.

Reissued Oct. 18, 1910.

13,159.

6 SHEETS—SHEET 4.

WITNESSES

Wm. L. Bushong

L. B. Moerner.

INVENTOR

Frederick A. Morgan,

By Minturn & Moerner,

ATTORNEYS.

THE NORRIS PETERS CO., WASHINGTON, D. C.

F. A. MORGAN.

INDICATING AND RECORDING DEVICE.

APPLICATION FILED MAR. 22, 1910.

Reissued Oct. 18, 1910.

13,159.

6 SHEETS—SHEET 5.

WITNESSES

Wm. L. Bushong.

C. B. Moerner

INVENTOR

Frederick A. Morgan,

By Minturn & Moerner,

ATTORNEYS.

THE NORRIS PETERS CO., WASHINGTON, D. C.

F. A. MORGAN.

INDICATING AND RECORDING DEVICE.

APPLICATION FILED MAR. 22, 1910.

Reissued Oct. 18, 1910.

13,159.

6 SHEETS—SHEET 6.

WITTNESSES

Wm. L. Bushong.

L. B. Moerner.

INVENTOR

Frederick A. Morgan,

By Minturn & Moerner,

ATTORNEYS.

THE NORRIS PETERS CO., WASHINGTON, D. C.

UNITED STATES PATENT OFFICE.

FREDERICK A. MORGAN, OF INDIANAPOLIS, INDIANA, ASSIGNOR TO MORGAN FARE REGISTER COMPANY, OF INDIANAPOLIS, INDIANA, A CORPORATION OF INDIANA.

INDICATING AND RECORDING DEVICE.

13,159. Specification of Reissued Letters Patent. Reissued Oct. 18, 1910.

Original No. 940,888, dated November 23, 1909, Serial No. 484,971. Application for reissue filed March 22, 1910. Serial No. 551,026.

*To all whom it may concern:*

Be it known that I, FREDERICK A. MORGAN, a citizen of the United States, residing at Indianapolis, in the county of Marion and State of Indiana, have invented certain new and useful Improvements in Indicating and Recording Devices, of which the following is a specification.

This invention relates to an improved fare registering and recording mechanism for use in connection with interurban cars as hereinafter described in the specification and particularly pointed out in the claims.

The object of this invention is to construct a combined recording and indicating machine for use in interburban cars whereby the amount of the fare collected, the name of the station from which passage is taken, together with the name of the station of destination may be indicated in successive order, in full view of the passengers, and simultaneously with each of the above successive operations select and arrange in proper order the corresponding characters designating the amount of fare collected, the name of the station from which passage is taken and the name of the station of destination, so that the same can be transferred bodily, before re-arranging the mechanism for indicating the fare collected from the next passenger, to a permanent record, which may be removed at the end of the trip. I attain these objects by means of the apparatus illustrated in the accompanying drawings in which like numerals of reference designate like parts throughout the several views.

Figure 2:
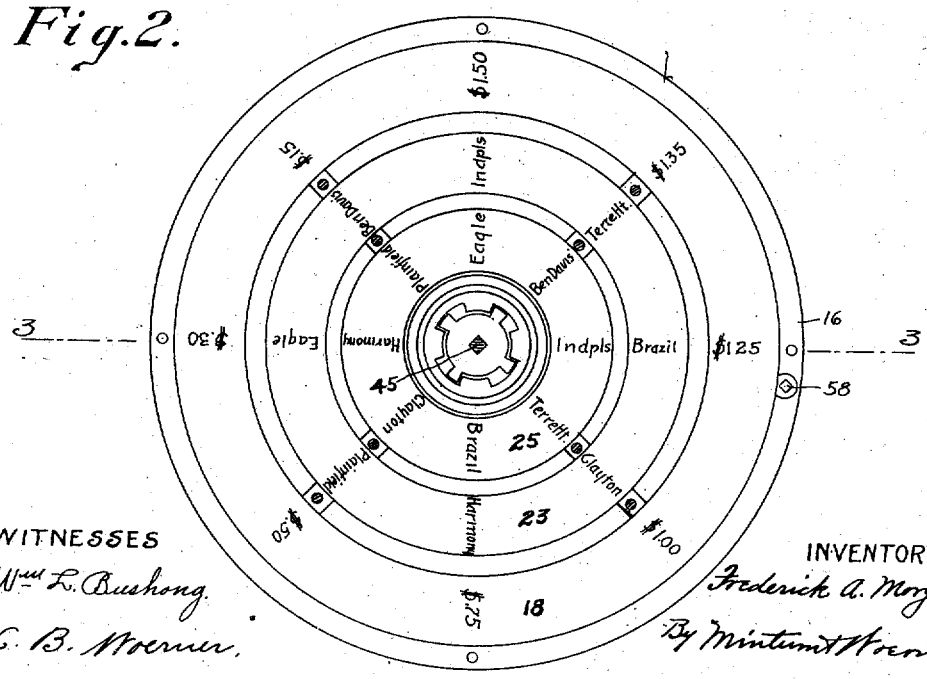
Figure 4:
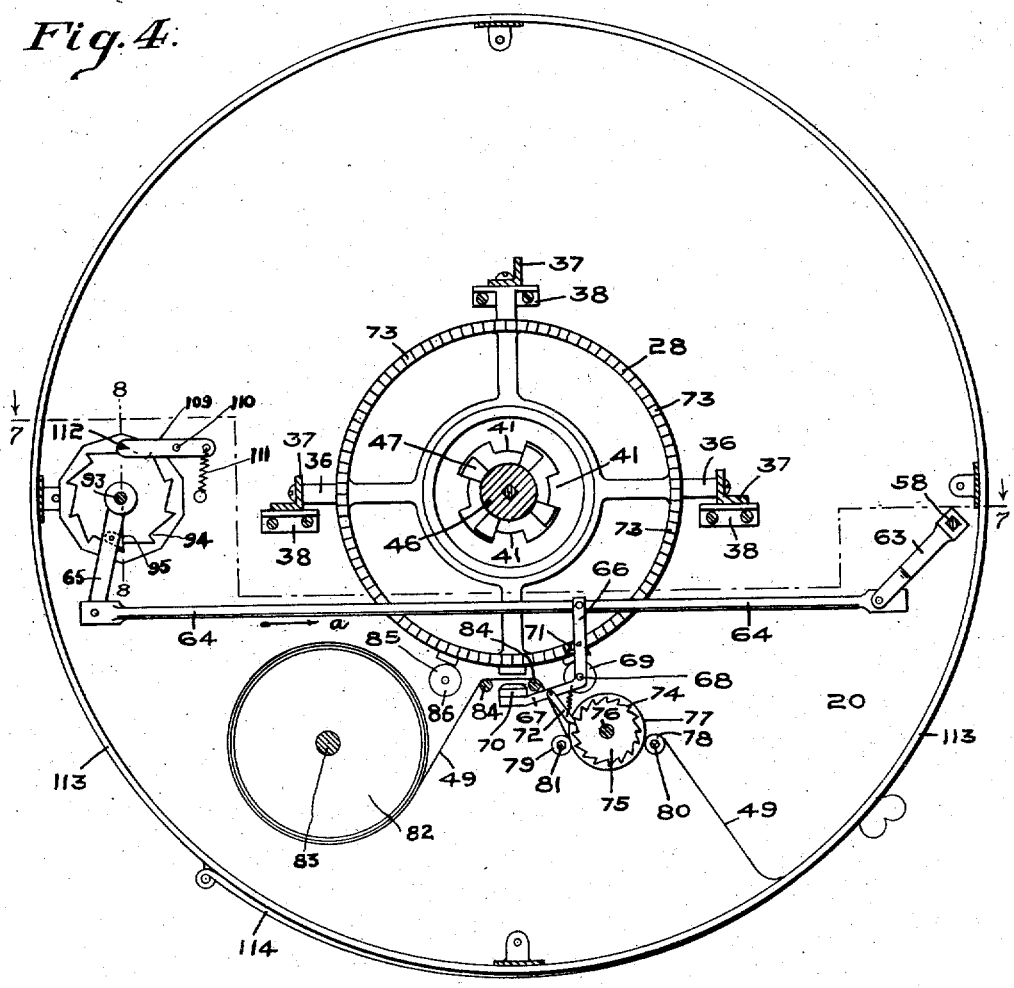
Figure 11:
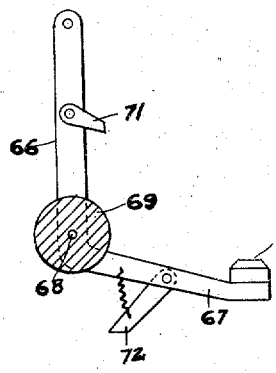
Figure 5:
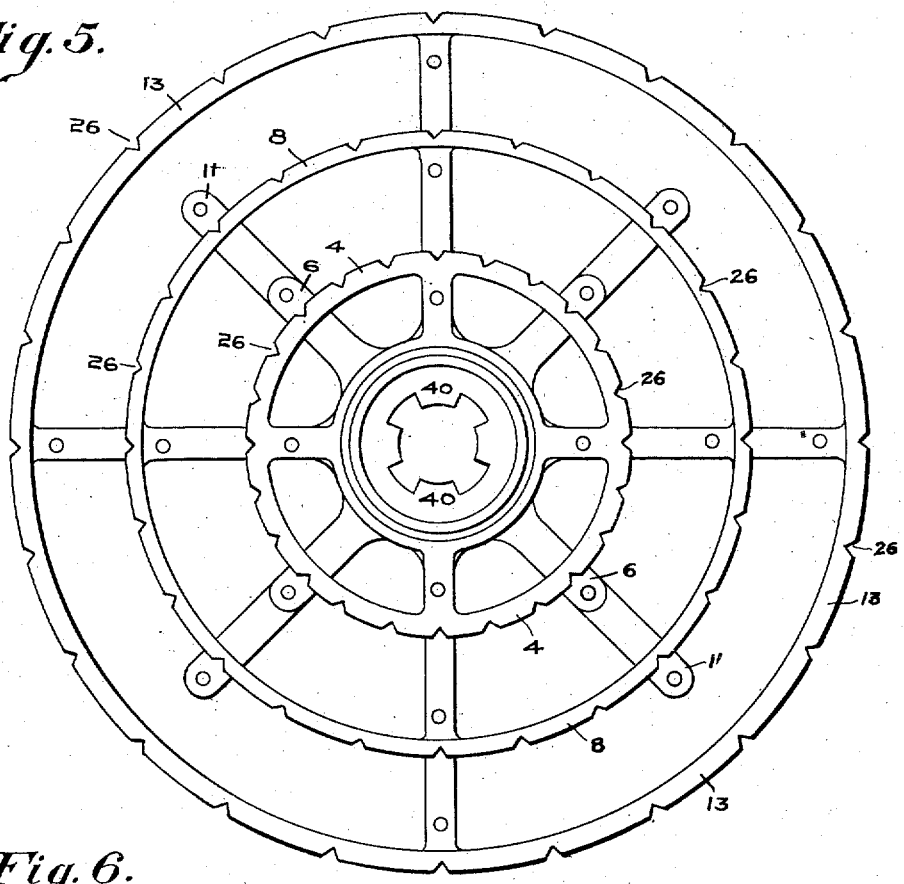
Figure 6:
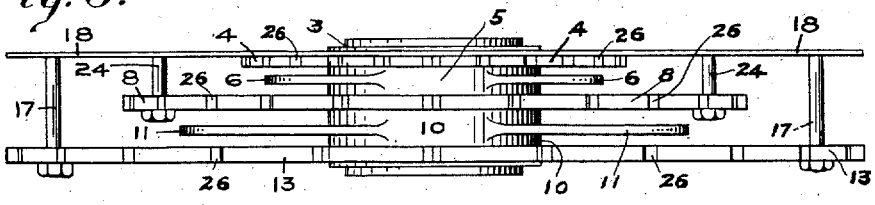
Figure 7:
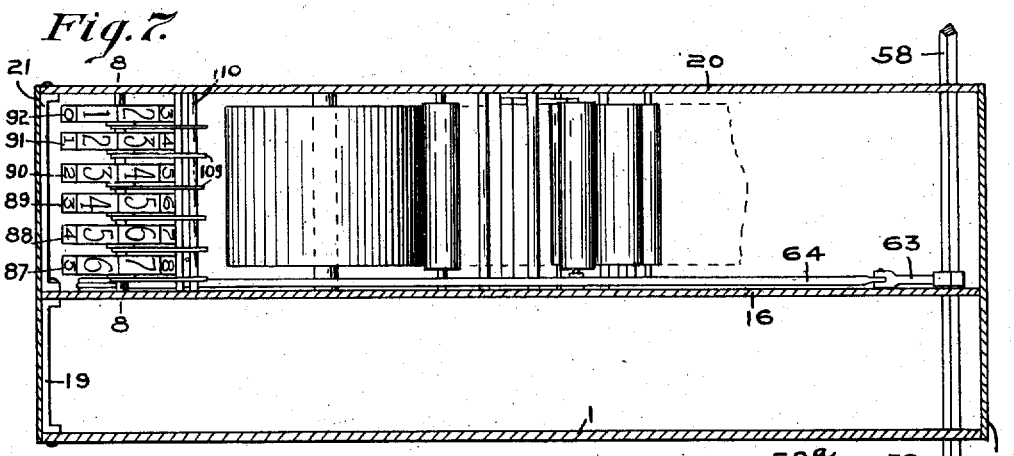
Figure 8:
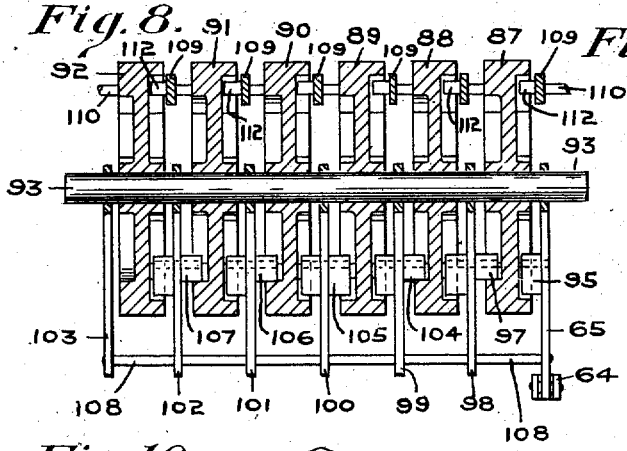
Figure 9:
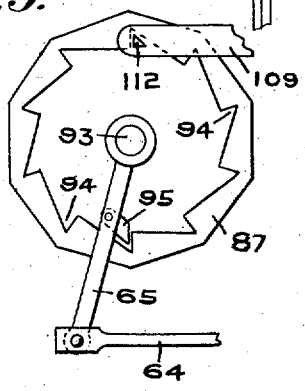
Figure 10:
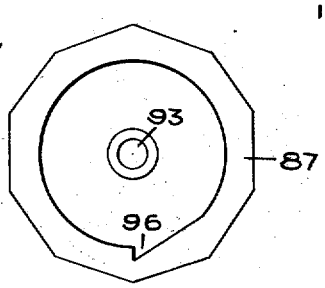
Figure 15:
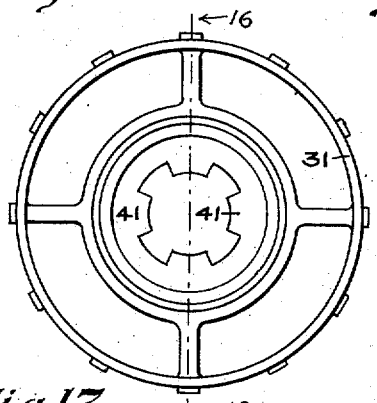
Figure 16:
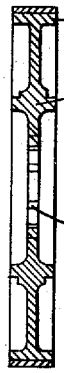
Figure 18:
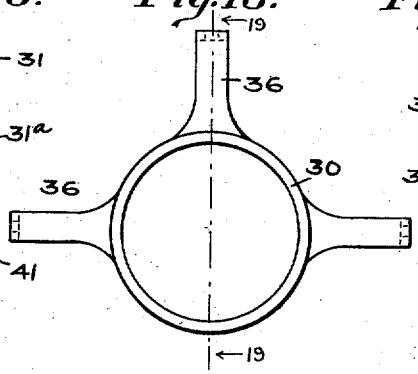
Figure 19:
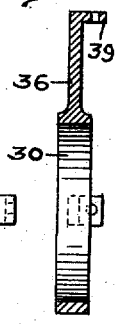
Figure 17:
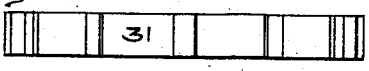
Figure 20:
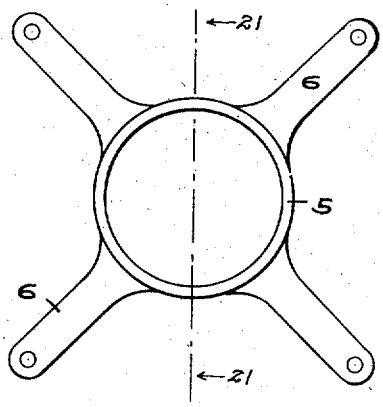
Figure 21:
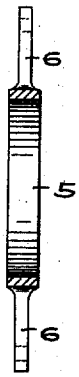
Figure 22:
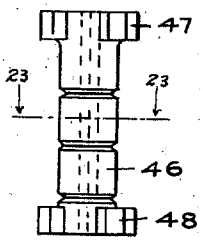
Figure 23:
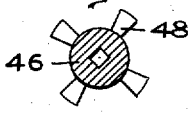

Figure 1 is a front view of the apparatus showing the face of the indicator; Fig. 2 is a front view of the apparatus showing the face removed to expose the concentric indicator disks of the apparatus; Fig. 3 is a horizontal sectional view of the apparatus taken along the line 3—3 in Figs. 1 and 2; Fig. 4 is a vertical sectional view of the apparatus taken along the line 4—4 in Fig. 3; Fig. 5 is an enlarged detail view of the disk carrying wheels showing the concentric indicator disks removed; Fig. 6 is a top view of the same showing the concentric indicator disks attached to said wheels; Fig. 7 is a horizontal sectional view of the apparatus showing the counting mechanism, and the disk carrying wheels of the indicator mechanism removed and taken along the line 7—7 in Fig. 4; Fig. 8 is an enlarged sectional detail view of the counting wheels and the pawl mechanism by which they are operated and taken along the line 8—8 in Figs. 4 and 7; Fig. 9 is a side view of the same; Fig. 10 is a detail view of the opposite side of one of the counting wheels showing the single detent of the counter wheel; Fig. 11 is an enlarged detail view of the platen carrying and pawl carrying arms of the printing mechanism; Fig. 12 is a detail view of the indicator-shaft carrying arm; Fig. 13 is an enlarged broken view of a portion of the same; Fig. 14 is a broken detail sectional view of the inner bushing and the bearing of said arm; Fig. 15 is a detail side view of one of the record transferring wheels; Fig. 16 is a section of the same taken along the line 16—16 in Fig. 15; Fig. 17 is an edge or top view of said wheel; Fig. 18 is a detail enlarged view of one of the bearing hangers for carrying the record transferring wheels; Fig. 19 is a sectional view of the same taken along the line 19—19 in Fig. 18; Fig. 20 is a detail enlarged view of one of the bearing hangers for carrying the disk carrying wheels; Fig. 21 is a sectional view of the same taken along the line 21—21 in Fig. 20; Fig. 22 is a side view of the key whereby the disk carrying and record transferring wheels are connected in pairs set simultaneously; and Fig. 23 is a sectional view of the same taken along the line 23—23 in Fig. 22.

Situated centrally on the surface of the disk 1, back of the face thereof, is formed the bearing 2 into which the enlarged hub portion 3 of the disk carrying wheel 4 is fitted to turn and on the opposite side of said wheel is formed the hub $2^a$ which is turned to fit in the bore of the bearing 5, so that said disk carrying wheel 4 is supported at both sides and securely held in its central position. The bearing 5 is provided with the hanger arms 6 which extend radially from the bearing 5 to a point beyond the periphery of the disk carrying wheel 4 so that the distance studs 7 may extend from said arms 6 to the disk 1 to maintain the said bearing in its fixed central position. The disk carrying wheel 8 is provided with the central hub 9 similar to the hub 3 which projects on both sides of the hub of said disk carrying wheel 8 and is turned truly at its projecting ends to fit into the bores of the bearings 5 and 10 to be rotated therein, and the said bearing 10 is provided with the arms 11 which are similar to the arms 6 of the bearing 5 and extend beyond the periphery of the wheel 8 and said arms are provided with supporting studs 12 whereby the bearing 10 is maintained firmly in position opposite the bearing 5. The larger disk carrying wheel 13 is provided with the hub 14 which projects on both sides of the web of the disk carrying wheel 13 and is turned truly to fit and to be rotated in the bearing 10 and the bearing 15, the latter being formed on the intermediate casing 16 of the indicator, and said bearings 10 and 15 are of equal diameters of bore to fit and receive the opposing equal projecting turned trunnion ends of the hub 14 of the disk carrying wheel 13 to freely turn therein. The disk carrying wheel 13 is provided with the distance studs 17 which extend from said wheel 13 to the concentric disk 18 to support and to revolve the latter with the said wheel. The intermediate casing 16 is connected to the disk face 1 by the distance bars 19, and the inclosing casing 20 of this apparatus is held in position relatively to said intermediate casing 16 by the distance bars 21 which bars are connected at their ends to said intermediate casing 16 and the casing 20 by the screws 22. The outer concentric indicator disk 18 has the values or fares designated on its face, as shown particularly in Figs. 1 and 2 of the drawings, and revolves with its disk carrying wheel 13 to which it is connected, as previously described, and the intermediate concentric indicator disk 23 upon the face of which the names of the way stations or stopping points at which a passenger leaves the car, or the destinations of the passenger are designated, revolves with the disk carrying wheel 8 to which it is connected by the supporting studs 24, and the central concentric indicator disk 25 upon the face of which the names of the way stations or the station at which a passenger enters the car, and consequently the station from which he pays his fare, are designated, and said concentric indicator disk 25 is directly connected to the web portion of the disk carrying wheel 4, and thus the place from which and to which a passenger travels, or his destination, and the fare for same are clearly indicated, and the record of such passage and cost of transportation of same is clearly recorded upon a permanent record by the mechanism hereinafter described.

The disk carrying wheels 4, 8, and 13 are each provided with notches 26 into which the stop springs 27 are adapted to move to engage in said notches to yieldingly retain said wheels from revolving and said notches are situated spaced apart in the periphery of such of said wheels so that a notch will be situated on a radial line with the line of the station or fare designated on the face of the concentric disk carried by it, so that when the said concentric disks are rotated into the position shown in Fig. 1 to indicate "From Indianapolis to Brazil, fare $1.35," the stop springs 27 will each move into that notch situated in relative radial position to the line of collineation of the names designated on the several concentric disks, to yieldingly retain said disk carrying wheels 4, 8, and 13 and the concentric disks 25, 23, and 18 carried by them in rotative position, so that said disks will not readily move when vibrated by the jolting of the car and cannot be rotated unless by the operator provided with a suitable key. The indicating and recording device is also provided with a printing device, whereby the amount of fare collected from a passenger, the name of the station from which he took passage and the name of the station of his destination may be transferred to a permanent record, and each line so transferred may be individually numbered. This printing device consists of the line numbering wheel 28, and the record transferring wheels 31, 32 and 33, all of said wheels being arranged in longitudinal alinement and in the rear of the disk carrying wheels 4, 8 and 13. The line numbering wheel 28 is provided with the hub 29 which projects from the opposing sides of the web of said wheel and said hub is turned truly on its peripheral projecting ends to fit into the bearing 15 situated at one side of said wheel and the bearing 30 situated at the other side of said wheel and both of which bearings are of equal diameters of bore and the said wheel 28 is almost similar to the record transferring wheels 31, 32 and 33 except that the rim thereof instead of being equally divided on each side of the web, as in the wheels 31, 32 and 33, is situated at one side of its web. The purpose of the numbering wheel 28 is to number each line of matter that is transferred by the wheels 31, 32 and 33 to the paper record 49, and the mechanism for actuating the wheel 28 will be hereinafter described. The record transferring wheel 31 is provided with the central hub 31[a] which projects equally on both sides of the web of said wheel 31 and said hub is turned truly at its peripheral projecting ends one end to fit into the bore of the bearing 30 the other to fit in the bore of the bearing 34 to be freely rotated therein. The record transferring wheel 32 is similar to that of the wheel 31 and is supported to be revolved in like manner in similar bearings. The record transferring wheel 33 is similar in construction and form to the wheels 31 and 32 and the hubs are alike and the hub of said wheel 33 is turned truly at its ends, the one end to fit and to turn in the bore of the bearing 35, the other to fit and turn in the bearing 33[a] formed centrally on the inclosing casing 20 to project from the surface thereof.

The bearing 34 situated between the record transferring wheels 31, 32 and the bearing 35 situated between the record transferring wheels 32 and 33, are similar in every respect to the bearing 30 and each of said bearings 30, 34 and 35 are provided with supporting arms 36 which are secured to the angle irons 37 carried by the angle iron brackets 38 secured to the intermediate casing 16 and the inclosing casing or back 20. The feet 39, of each of the arms 36, are securely bolted to the supporting angle irons 37 and the upper angle iron 37. Each of said angle irons 37 rests upon and is secured to the angle iron brackets 38 which latter are secured by suitable screws to the inclosing casing 20 and the intermediate casing 16 of the machine, so that the bearings 30, 34 and 35 are securely maintained in alinement with each other, and the record transferring wheels will turn freely in said bearings. In each of the central portions of the disk carrying wheels 4, 8 and 13 are formed the internal teeth 40, and centrally in the hubs of said record transferring wheels 31, 32 and 33, and central with said disk carrying wheels, are formed similar teeth 41, and the central openings in each of the hubs are alike and equal in size and adapted to receive the trunnion-key 46. Formed central on the center of the disk face 1 is the bearing 42 which is situated centrally with the axes of the said disk carrying wheels 4, 8 and 13, and the line numbering and record transferring wheels 28, 31, 32 and 33, all of which are on the same axis center, and in said bearing is a bushing 43 which is turned to fit in said bearing 42 to freely turn therein. In the inclosing casing 20 is secured centrally the bearing 44 which is situated directly opposite and in alinement with the bearing 42 and the said bearing 44 is bored to receive the bushing 44[a] which fits accurately and turns freely therein. Centrally in said bushings 43 and 44[a] are formed longitudinal square bores into which the square shaft 45 is fitted to slide longitudinally therein and to turn therewith, and on this shaft is secured the key 46 to be turned therewith. The key 46 is provided with the end teeth 47 and 48 both of which are alike and situated in like positions relatively to each other around the periphery of said key 46, and said key is provided with a longitudinally extending bore adapted to fit said shaft 45 and is secured thereto to turn therewith, so that when the said shaft is moved longitudinally to change the position of the key, the teeth 48 thereof will engage one of the internal teeth 40 of the series of the disk carrying wheels 4, 8 and 13, and the teeth 47 will simultaneously engage one of the internal teeth 41 of the series of corresponding record transferring wheels 31, 32 and 33, so that a disk carrying wheel and a record transferring wheel are engaged simultaneously and in corresponding pairs, and the amount of fare collected, the place from which a passenger is leaving and to which he is going, or the name of the place of his destination, is indicated on the concentric indicator disks 25, 23 and 18, and simultaneously the record transferring wheels 31, 32 and 33 are arranged to bring the characters designating the fare collected, name of station of taking passage and name of station of destination, into alinement to be subsequently transferred, by printing or otherwise, to a permanent record.

The indicator is situated centrally, or nearly so, of the top portion of the car, so as to be in full view of every passenger in the car, and the indicator shaft 45 thereof may extend both forwardly and rearwardly of the indicator, rearwardly of the indicator in the regular passenger department and forwardly of the indicator to project into the smoking compartment of the car which is usually situated at the front portion of the car. At suitable intervals apart along the indicator shaft 45 are situated suitable bushings 50 which are each provided with square holes into which said shaft is adapted to fit to freely slide therein and the said bushings 50 are turned on their outer peripheries to fit into the bearings 51 and turn freely therein, and said bearings are carried by the arms 52 extending from the side top portion of the car. A gage 53 is secured to extend from the side of one of said arms 52, see Fig. 3, parallel to the shaft 45, and on the face of said gage is printed or engraved the words "Fare," "To" and "From" and projecting from the side of said gage are the pointers 54, 55 and 56. A collar 57 is secured in such position on the shaft 45, so that when the latter is moved longitudinally till the flange of the collar 57 is situated directly opposite the pointer 56, the teeth 48 of the key 46 engage the teeth 40 of the disk carrying wheel 4 and the teeth 47 of said key will simultaneously engage the teeth 41 of the record transferring wheel 31, which wheel corresponds to the inner concentric disk 25 and has type arranged on its peripheral face corresponding to the name on the face of said inner concentric disk 25, so that when the inner concentric disk is rotated till the name of the station at which a passenger enters the car appears before the aperture 115 in the disk plate 1, as the word "Indianapolis," the record transferring wheel 31 will be rotated till the type spelling "Indianapolis"

is revolved in position over the record paper 49 to be printed on said paper, and, thus as each concentric disk is set, a record transferring wheel, corresponding to said concentric disk is arranged to bring the type spelling the name indicated on the companion concentric disk in position over the record paper 49 and in line with the type on the wheel previously set, so that the names and numerals indicated on the several disks may be subsequently transferred from said record transferring wheels 31, 32 and 33 to the record paper 49. The mechanism by which the record is transferred from the wheels 31, 32 and 33 to the record paper 49, I will now proceed to describe.

A secondary or fare registering shaft 58 extends through the right hand lower portion of the indicator and register to project beyond the front face of the indicator and longitudinally along the top portion of the car in parallel relation with the shaft 45, and the forward end portion of said shaft 58 extends forwardly through the partition 59 through the bushing 60, which bushing is turned to fit and freely turn in its bearing 61 formed in the lower arm 52, by which bearing said shaft 58 is supported and carried at intervals along its length. The arms 52 are spaced at intervals along said shaft 58 and secured in position to the car so that the shaft is easily accessible to a conductor when a fare is required to be rung up and registered. On the shaft 45 hand grips 62 are secured at suitable intervals apart, and the same are provided for the purpose of turning and moving said shaft longitudinally to set the same to the position required to turn the disk carrying wheels 4, 8 and 13, to indicate a fare and the place from which a passenger is leaving and the destination, and, also, to turn the record transferring wheels 31, 32 and 33, so that the characters thereon, representing the fare, name of station of taking passage and name of station of destination, will be brought into a line. On the shaft 58, and situated to operate in the rear compartment of the indicator, is the arm 63 to the lower depending end of which one end of the connecting rod 64 is connected and to the other end of said connecting rod 64 is connected the depending pawl carrying-arm 65 of the counting mechanism by which the latter is operated. The connecting rod 64 is centrally and pivotally engaged by the vertically extending lever arm 66, which terminates in the horizontally extending arm 67, and said lever 66 is pivotally mounted on one end of the arbor 68 of the inking roller 69, and the horizontally extending arm 67 is provided with the platen 70 the top flat surface of which is situated in parallel relation to the faces of the line numbering and record transferring wheels 28, 31, 32 and 33, and said platen is adapted to strike the paper 49 with every reciprocation of the connecting rod 64 to press said platen against the record paper and the record paper against the type on the face of the line numbering and record transferring wheels to receive an impression from each simultaneously and on a straight line to extend transversely of the record paper 49 to read from left to right.

On the arms 66 and 67 of the bell crank lever are pivoted the pawls 71 and 72. The pawl 71, which is pivotally connected on the vertically extending arm 66, is adapted to alternately engage the ratchet teeth 73 of the line numbering wheel 28, and the pawl 72, carried by and pivotally connected on the horizontally extending lever arm 67, is adapted to alternately engage the teeth 74 of the ratchet wheel 75 secured on one end of the arbor 76 of the paper feed roller 77 to rotate the latter. The periphery of the roller 77 is adapted to contact and slightly press against the peripheries of the parallel rollers 78 and 79 and said rollers have the ends of their arbors 80 and 81 adapted to fit in suitable bearings formed in the intermediate casing 16 and the inclosing casing 20 to freely turn therein. The paper roller 82 upon which the paper 49 is rolled is provided with the arbor 83 which latter is also supported in suitable bearings formed in the intermediate casing 16 and the inclosing casing 20. The paper guiding rollers 84 maintain the paper 49 in horizontal position under the peripheral surfaces of the line numbering and record transferring wheels 28, 31, 32 and 33, and the said rollers are sufficiently far apart so that the platen 70 will freely pass between them and move the paper 49 upwardly toward the type of said line numbering and record transferring wheels to receive an impression therefrom. The inking rollers 85 and 69 are situated one on each side of the vertical center line of the line numbering and record transferring wheels 28, 31, 32 and 33 in position to contact with the type thereof, so that if the wheels are revolved in either a right or left hand direction either one of the rollers 69 or 85 will operate to ink the type before reaching its vertical position over the paper 49 to print on it, and said inking rollers 85 and 69 are provided with the arbors 68 and 86 the ends of which are journaled in suitable bearings formed in the intermediate casing 16 and the inclosing casing 20 to turn freely therein. At intervals along the shaft 58 are secured hand levers 58[a] and said levers are provided and so arranged along said shaft as to be conveniently reached by the conductor to ring up or record a fare collected by him.

The device is also provided with a counting mechanism for keeping a total of the number of fares collected during a given number of working hours, and may be of any suitable type of well-known counting mechanism, but I have adopted the mechanism shown particularly in Figs. 4, 8, 9 and 10 as the best adapted for use in connection with my fare indicating and recording mechanism and which I will now proceed to describe:—This mechanism consists of a series of counter wheels each arranged side by side, as the wheels 87, 88, 89, 90, 91 and 92 which are mounted on a common arbor 93 which arbor is supported at its ends in suitable bearings formed in the intermediate casing 16 and the inclosing casing 20. Each of said counting wheels are alike in form and construction, so that a description of the unit wheel 87 will suffice for all. This wheel is in the form of a decagon or is ten sided and on these sides are marked in rotation the numerals 1 to 0 inclusive, as shown in Fig. 7, each wheel is provided alike with the internal detents 94 on one side which detents are ten in number corresponding with the peripheral sides of the wheel, which are also ten in number, and said detents are adapted to be alternately engaged by the feed pawl 95 carried by the depending arm 65 so that for each vibration of the arm 65 the counter wheel 87 is moved one tooth or the tenth part of a revolution. On the opposite side of the web of the counter wheel 87 is formed a single detent 96 which is adapted to be engaged by one side of the double pawl 97 which is pivotally mounted on the depending vibration pawl carrying arm 98 and the remaining counter wheels 88, 89, 90, 91 and 92 are alike and similar to the unit counter wheel 87 and said wheels are operated by the depending pawl carrying arms 99, 100, 101, 102 and 103 which carry the pawls 104, 105, 106 and 107 and said pawl carrying arms 65, 98 to 103 inclusive are connected to swing simultaneously by the tie rod 108 which rigidly secures said arms in alinement. The pawl levers 109 are situated one between each pair of counter wheels, and said levers are alike in construction and are mounted on the shaft 110 secured at its ends in the intermediate casing 16 and the inclosing casing 20 and each of said levers is provided with a coil spring 111 whereby its pawl 112 is yieldingly maintained in gear with a detent of a counter wheel. A further description of these counting wheels is unnecessary, as the construction and operation of this and other various types of counting wheel mechanism is well-known to those skilled in the art and could be readily supplied by them.

This fare indicator and register is preferably constructed of a cylindrical form and the mechanism is inclosed by the outer cylindrical casing 113 which is suitably secured to distance bars 19. A door 114 is provided in said casing and is situated under the paper printing mechanism, and said door is provided for the purpose of gaining access to the interior of the recording mechanism and for removing the printed paper record 49 when such is necessary.

The practice of this invention I will now proceed to describe:—Suppose it is desired to indicate a trip from Indianapolis to Brazil and the fare of $1.25. To do this the operator first moves the setting shaft 45 longitudinally till the teeth 48 of the key 46 engage the internal teeth 40 of the disk carrying wheel 4 and the teeth 47 of said key 46 simultaneously engage the internal teeth 41 of the companion record transferring wheels 31. The operator then rotates the shaft 45 to rotate the disk carrying wheel 4 till the word "Indianapolis" on the concentric disk 25 appears through the aperture 115 in the disk 1, and simultaneously the record transferring wheel 31 is rotated until the characters spelling the word Indianapolis are brought into place directly over the platen 70. This done the operator moves the shaft 45 longitudinally till the teeth 48 of the key 46 engage the internal teeth of the disk carrying wheel 8 and the teeth 47 of said key 46 simultaneously engage the internal teeth 41 of the companion record transferring wheel 32. The operator again rotates the shaft 45 to rotate the disk carrying wheel 8 till the word "Brazil" on the concentric disk 23 appears through the aperture 116, and simultaneously the record transferring wheel 32 is rotated until the characters spelling the word Brazil are brought into alinement with the word Indianapolis on the wheel 31 and directly over the platen 70, and similarly the disk carrying wheel 13 and the record transferring wheel 33 are operated to be set till the amount of fare, namely, $1.25 on the concentric disk 18 is exhibited through the aperture 117 and the numerals on the record transferring wheel 33, indicating the amount of fare, are moved into line with the words Indianapolis and Brazil, immediately above the platen 70. The operator now takes hold of one of the lever arms 58[a] on the shaft 58 to partially rotate the counter mechanism operating shaft 58 to simultaneously operate the arms 66 and 67 of the bell-crank lever and the depending arms 65, 98, 99, 100, 101, 102 and 103 of the counter mechanism to record the number of fares. The connecting rod 64 on moving forwardly or in the direction of the arrow *a*, moves the end of the arm 67 upwardly to cause the platen 70 to strike that portion of the paper 49 situated between the paper guiding rollers 84 to force the surface of said paper 49 against the type secured on the peripheral faces of the line numbering wheel 28 and the record transferring wheels 31, 32 and 33 to make a printed record of the stations and fare on the paper as indicated on the concentric disks 25, 23 and 18 and visible through the apertures 115, 116 and 117 in the disk 1. On the return movement to normal position the shaft 58 moves the connecting rod 64 and simultaneously works the arms 66 and 67, the pawls 71 and 72 thereof operate to rotate the wheel 28 and the paper roller 77, the former to place the next succeeding type number in position on the line numbering wheel 28 for designating a new line on the record paper and the latter to introduce a clean unprinted portion of the record paper 49 to be printed upon it and so on, continuously as the destinations of the passengers and the fares collected and indicated are recorded on the record paper 49.

I claim:

1. In an indicating and recording device, the combination with a series of indicator disks, a series of disk-carrying wheels by which said indicator disks are carried, and a series of record transferring wheels arranged in a row and situated back of said disk-carrying wheels, of means for engaging one of each of the series of said record transferring wheels and disk carrying wheels whereby an indicator disk and a companion record transferring wheel may be simultaneously rotated to be set.

2. In an indicating and recording device, the combination with a series of concentric indicator disks, a series of disk-carrying wheels by which said indicator disks are carried and a series of record transferring wheels arranged in a row and situated back of and in a line with said disk-carrying wheels and on the same axial center, of a key adapted to engage one of each of the series of disk-carrying and record transferring wheels, whereby an indicator disk and a companion record transferring wheel may be simultaneously rotated to be set.

3. In an indicating and recording device, the combination with a series of concentric indicator disks situated in one plane, a series of disk-carrying wheels situated on the same axis of said indicator disks and back of the latter, a series of record transferring wheels arranged in a row and situated back of and in a line with said disk-carrying wheels and on the same axial center, of a key adapted to engage one of each of the disk-carrying and record transferring wheels whereby an indicator disk and a companion record transferring wheel may be simultaneously rotated to be set.

4. In an indicating and recording device, the combination with a series of concentric station and fare indicator disks the faces of which are situated in one plane, a series of disk-carrying wheels situated on the same axial center as said disks and back of the latter, means whereby a single indicator disk is connected to and carried by each of said disk-carrying wheels, a series of record transferring wheels arranged in a row and situated back of and on the same axial center as said indicator disks and said disk-carrying wheels, of a setting key adapted to simultaneously engage one of each of said disk-carrying and record transferring wheels whereby an indicator disk and a companion record transferring wheel may be simultaneously rotated to be set.

5. In an indicating and recording device, the combination with a series of concentric station and fare indicator disks the faces of which are situated in one plane, a series of disk-carrying wheels situated on the same axial center as said indicator disks and back of the latter, means whereby a single indicator disk is connected to and carried by each of said disk-carrying wheels, retaining springs engaging said disk-carrying wheels whereby each is yieldingly retained in its set position, a series of record transferring wheels arranged in a row and situated back of and on the same axial center as said indicator disks and said disk-carrying wheels, of a setting key adapted to simultaneously engage one of each of said disk-carrying and said record transferring wheels whereby an indicator disk and a companion record transferring wheel may be simultaneously rotated to be set.

6. In an indicating and recording device, the combination with a series of concentric indicator disks, a series of disk-carrying wheels by which said indicator disks are carried, and rotated, a series of record transferring wheels arranged in a row and situated back of said disk-carrying wheels, and means for simultaneously engaging one of each of the series of said disk-carrying and said record transferring wheels whereby an indicator disk and a companion record transferring wheel may be simultaneously set, of a record paper situated under said record transferring wheels, means for guiding said record paper and feeding it under said record transferring wheels, means for inking said record transferring wheels, and a platen adapted to be moved upwardly to press the record paper against said record transferring wheels.

7. In an indicating and recording device, the combination with a series of concentric indicator disks, a series of disk-carrying wheels whereby said disks are carried and rotated, a series of record transferring wheels arranged in a row and situated back of said disk-carrying wheels, and means for simultaneously engaging one of each of the series of said disk-carrying and said record transferring wheels whereby an indicator disk and a companion record transferring wheel may be simultaneously set, of a pair of record paper carrying and guiding rolls situated under said record transferring wheels and parallel therewith, a record paper carried by said rolls, suitable inking rollers situated under and in contact with said record transferring wheels and parallel therewith, a platen situated to pass between said paper guide rollers to cause said record paper to contact with said record transferring wheels, and a paper feed roller.

8. In an indicating and recording device, the combination with a series of concentric indicator disks, a series of disk-carrying wheels whereby said disks are carried and rotated, a series of record transferring wheels arranged in a row and situated back of said disk-carrying wheels, and means for simultaneously engaging one of each of the series of said disk-carrying and said record transferring wheels whereby an indicator disk and a companion record transferring wheel may be simultaneously set, of a pair of record paper carrying and guiding rolls situated under said record transferring wheels and parallel therewith, a record paper carried by said rolls, suitable inking rollers situated under and in contact with said record transferring wheels and parallel therewith, a platen situated to pass between said paper guide rollers to cause said record paper to contact with said record transferring wheels, a paper feed roller, a fare counting mechanism and suitable mechanism for operating said counting mechanism.

9. In an indicating and recording device, a group of independent movable indicators provided with suitable characters for displaying the names of the stations from which and to which passage is taken and the amounts of fares collected, a group of independent movable companion record transferring features provided with characters like those carried by said indicators, and a single operative means for simultaneously selecting and arranging an indicator and its companion record transferring feature, to bring the like characters on each into predetermined positions.

10. In an indicating and recording device, a group of independent movable indicators provided with suitable characters for displaying the names of the stations from which and to which passage is taken and the amounts of fares collected, a group of independent movable companion record transferring features provided with characters like those carried by said indicators, and a single operative means for simultaneously moving an indicator and its companion record transferring feature a uniform distance.

11. In an indicating and recording device, a group of independent movable indicators provided with suitable characters for displaying the names of the stations from which and to which passage is taken and the amounts of fares collected, a group of independent movable companion record transferring features provided with characters like those carried by said indicators, and a single operative means for simultaneously moving an indicator and its companion record transferring feature a uniform distance in the same direction.

12. In an indicating and recording device, a group of independent movable indicators provided with suitable characters for displaying the names of the stations from which and to which passage is taken and the amounts of fares collected, a group of independent movable companion record transferring features provided with characters like those carried by said indicators, and a single operative means capable of successive longitudinal movement for connecting in pairs one of said indicators and its companion record transferring feature.

13. In an indicating and recording device, a group of independent movable indicators provided with suitable characters for displaying the names of the stations from which and to which passage is taken and the amounts of fares collected, a group of independent movable companion record transferring features provided with characters like those carried by said indicators, and a single operative means capable of progressive longitudinal movement for connecting in pairs one of said indicators and its companion record transferring feature.

14. In an indicating and recording device, a group of independent movable indicators provided with suitable characters for displaying the names of the stations from which and to which passage is taken and the amounts of fares collected, a group of independent movable companion record transferring features provided with characters like those carried by said indicators, and a single operative means capable of successive longitudinal and rotatorial movements for connecting in pairs one of said indicators and its companion record transferring features and for uniformly moving said pairs when connected.

15. In an indicating and recording device, a group of independent movable indicators provided with suitable characters for displaying the names of the stations from which and to which passage is taken and the amounts of fares collected, a group of independent movable companion record transferring features provided with characters like those carried by said indicators, and a single operative means capable of progressive longitudinal and rotatorial movements for connecting in pairs one of said indicators and its companion record transferring features and for uniformly moving said pairs when connected.

16. In an indicating and recording device, a group of independent movable indicators provided with suitable characters for displaying the names of the stations from which and to which passage is taken and the amounts of fares collected, a group of independent movable companion record transferring features provided with characters like those carried by said indicators, a single operative means capable of both successive and progressive longitudinal and rotatorial movements for connecting in pairs one of said indicators and its companion record transferring features and for uniformly moving said parts when connected, and means for indicating the longitudinal travel of said operative means.

17. In an indicating and recording device, a group of independent movable indicators provided with suitable characters for displaying the names of the stations from which and to which passage is taken and the amounts of fares collected, a group of independent movable companion record transferring features provided with characters like those carried by said indicators, a single operative means capable of both successive and progressive longitudinal and rotatorial movements for connecting in pairs one of said indicators and its companion record transferring features and for uniformly moving said parts when connected, and means for yieldably retaining said indicators in the position in which they are set.

In witness whereof, I, have hereunto set my hand at Indianapolis, Indiana, this 18th day of March, 1910, A. D., one thousand nine hundred and ten.

FREDERICK A. MORGAN.

Witnesses:

F. W. Woerner,

L. B. Woerner.